United States Patent
Zaidi et al.

(10) Patent No.: US 10,142,113 B2
(45) Date of Patent: Nov. 27, 2018

(54) IDENTIFYING AND MAINTAINING SECURE COMMUNICATIONS

(71) Applicant: Bank of America Corporation, Charlotte, NC (US)

(72) Inventors: Farrukh Zaidi, Port Washington, NY (US); Husam Abu-Zaydeh, East Brunswick, NJ (US); Morgan S. Allen, Charlotte, NC (US); Robert Bosi, East Windsor, NJ (US); Brian Edward Doyle, Scotch Plains, NJ (US); Michael Edwin Feeny, Lafayette Hill, PA (US)

(73) Assignee: Bank of America Corporation, Charlotte, NC (US)

( * ) Notice: Subject to any disclaimer, the term of this patent is extended or adjusted under 35 U.S.C. 154(b) by 128 days.

(21) Appl. No.: 14/743,674

(22) Filed: Jun. 18, 2015

(65) Prior Publication Data
US 2016/0373263 A1 Dec. 22, 2016

(51) Int. Cl.
*H04L 9/32* (2006.01)
*H04L 29/06* (2006.01)

(52) U.S. Cl.
CPC .......... *H04L 9/3268* (2013.01); *H04L 9/3265* (2013.01); *H04L 63/0823* (2013.01); *H04L 63/168* (2013.01)

(58) Field of Classification Search
CPC ......... H04L 9/32; H04L 9/321; H04L 9/3247; H04L 9/3263; H04L 9/3268; H04L 9/3265; H04L 63/0823; H04L 63/168
See application file for complete search history.

(56) References Cited

U.S. PATENT DOCUMENTS

| | | | |
|---|---|---|---|
| 9,166,970 B1* | 10/2015 | Dundas | H04L 63/0823 |
| 2005/0069136 A1* | 3/2005 | Thornton | H04L 63/0823 380/277 |
| 2008/0232595 A1* | 9/2008 | Pietrowicz | G06Q 20/3829 380/277 |
| 2010/0091994 A1* | 4/2010 | Schiefelbein | H04L 9/3273 380/277 |

* cited by examiner

*Primary Examiner* — Ayoub Alata
(74) *Attorney, Agent, or Firm* — Michael A. Springs

(57) ABSTRACT

In one embodiment, a system for managing secure communications includes an interface that may receive communication between a first endpoint and a second endpoint. A processor may identify a security certificate included in the communication and determine whether the identified security certificate has previously been stored in a certificate database. If the security certificate has not been previously stored in a certificate database, the processor may store the identified security certificate in the certificate database. The processor may also analyze parameters of the identified security certificate including a host device using the certificate, a network administrator responsible for the host device, an expiration date of the security certificate, and a certification authority issuing the security certificate.

20 Claims, 3 Drawing Sheets

IDENTIFYING AND MAINTAINING SECURE COMMUNICATIONS

TECHNICAL FIELD

The present invention relates generally to the field of networking and, more specifically, to identifying and maintaining secure communications.

BACKGROUND

Every day millions of online transactions are conducted over secure connections between web servers and web browsers. Establishing secure online connections between an enterprise and its customers is critical when dealing with sensitive information such as login credentials and data transfers. Enterprises spend significant resources ensuring that secure online communications with their customers proceed in an efficient manner. Furthermore, large enterprises may have expansive intra-enterprise networks that rely on secure communications between network devices. One way to establish secure online communications involves the using the https protocol.

SUMMARY

In accordance with the present disclosure, disadvantages and problems associated with identifying and maintaining secure communications may be reduced or eliminated.

In one embodiment, a system for managing secure communications includes an interface that may receive communication between a first endpoint and a second endpoint. A processor may identify a security certificate included in the communication and determine whether the identified security certificate has previously been stored in a certificate database. If the security certificate has not been previously stored in a certificate database, the processor may store the identified security certificate in the certificate database. The processor may also analyze parameters of the identified security certificate including a host device using the certificate, a network administrator responsible for the host device, an expiration date of the security certificate, and a certification authority issuing the security certificate.

In some embodiments, a method for managing secure communications includes receiving, at an interface, a communication between a first endpoint and a second endpoint. The method may also include identifying, using a processor communicatively coupled to the interface, a security certificate included in the communication and determining whether the identified security certificate has previously been stored in a certificate database. In response to determining that the identified security certificate has not been previously stored in a certificate database, the method may include storing the identified security certificate in the certificate database. The method may also include analyzing parameters of the identified security certificate, wherein the parameters include a host device using the certificate, a network administrator responsible for the host device, an expiration date of the security certificate, and a certification authority issuing the security certificate.

Certain embodiments of the disclosure may provide one or more technical advantages. One advantage of the present disclosure provides a system for identifying unknown secure sockets layer (SSL) certificates used by an enterprise, which prevents the expiration of the unknown SSL certificates that would otherwise result in an untrusted connection between network devices. Another advantage of the present disclosure allows for the efficient management of SSL certificates for enterprise systems by identifying and tracking the lifespan of SSL certificates and alerting the enterprise before an SSL certificate expires. Yet another advantage of the present disclosure alerts system engineers to SSL certificate problems by specifically identifying the servers within the enterprise relying on active SSL certificates, which results in improved network communications. One or more other technical advantages may be readily apparent to one skilled in the art from the figures, descriptions, and claims, included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
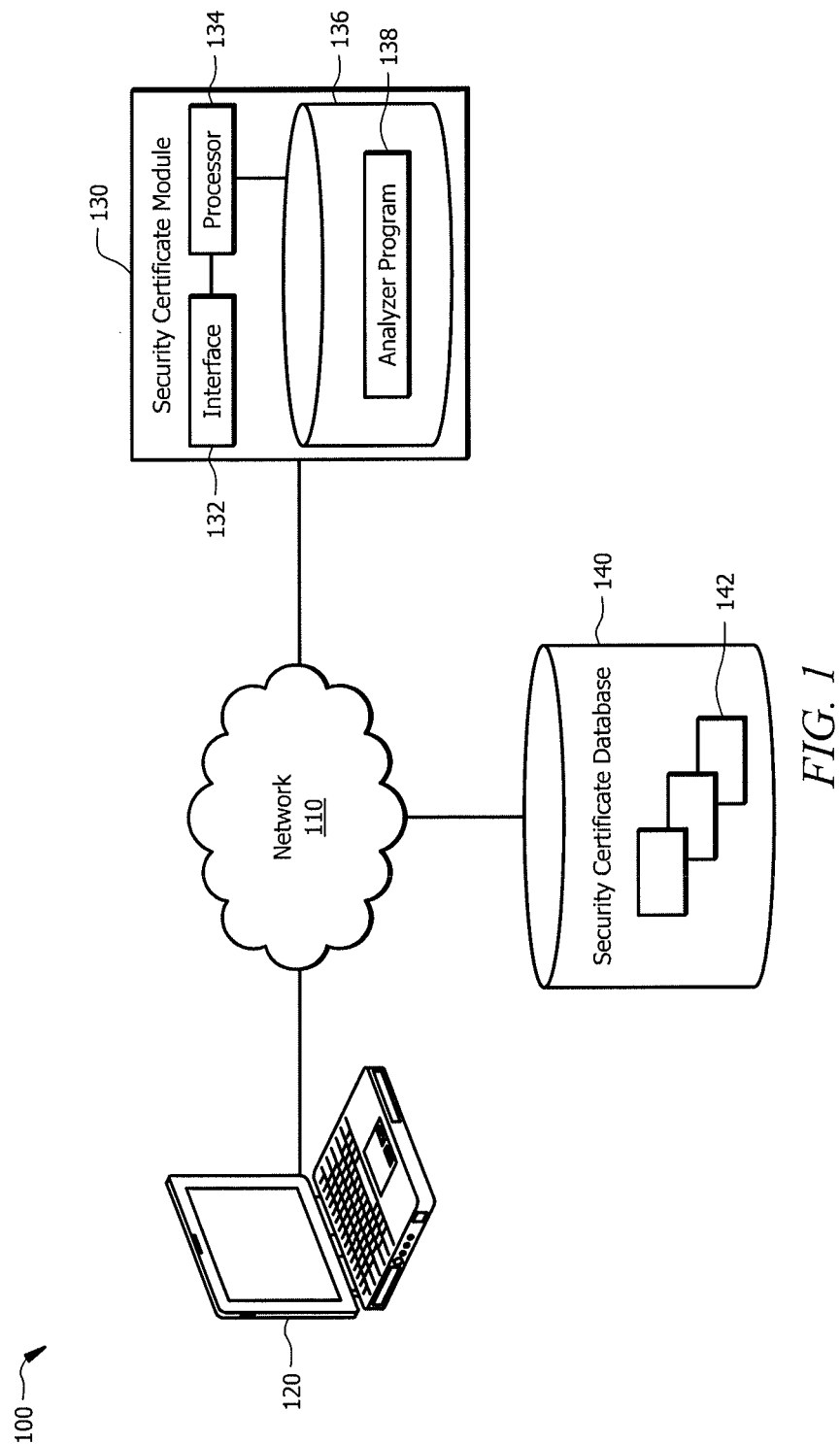
FIG. 1 is an example system for identifying and maintaining secure communications.
Figure 2:
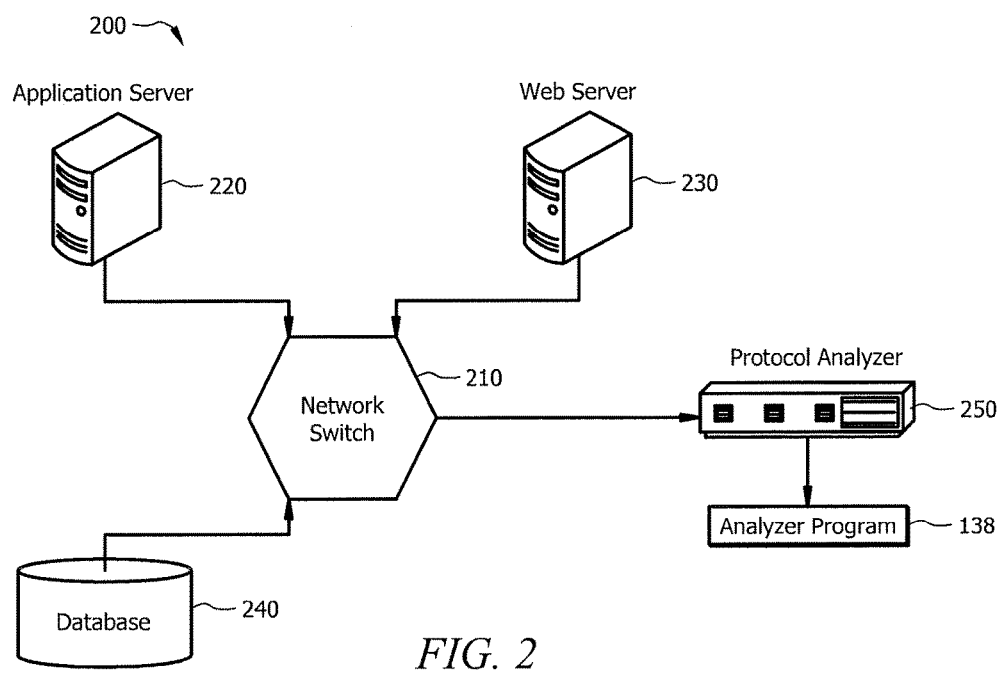
FIG. 2 is an example block diagram for detecting security certificates within a network.
Figure 3:
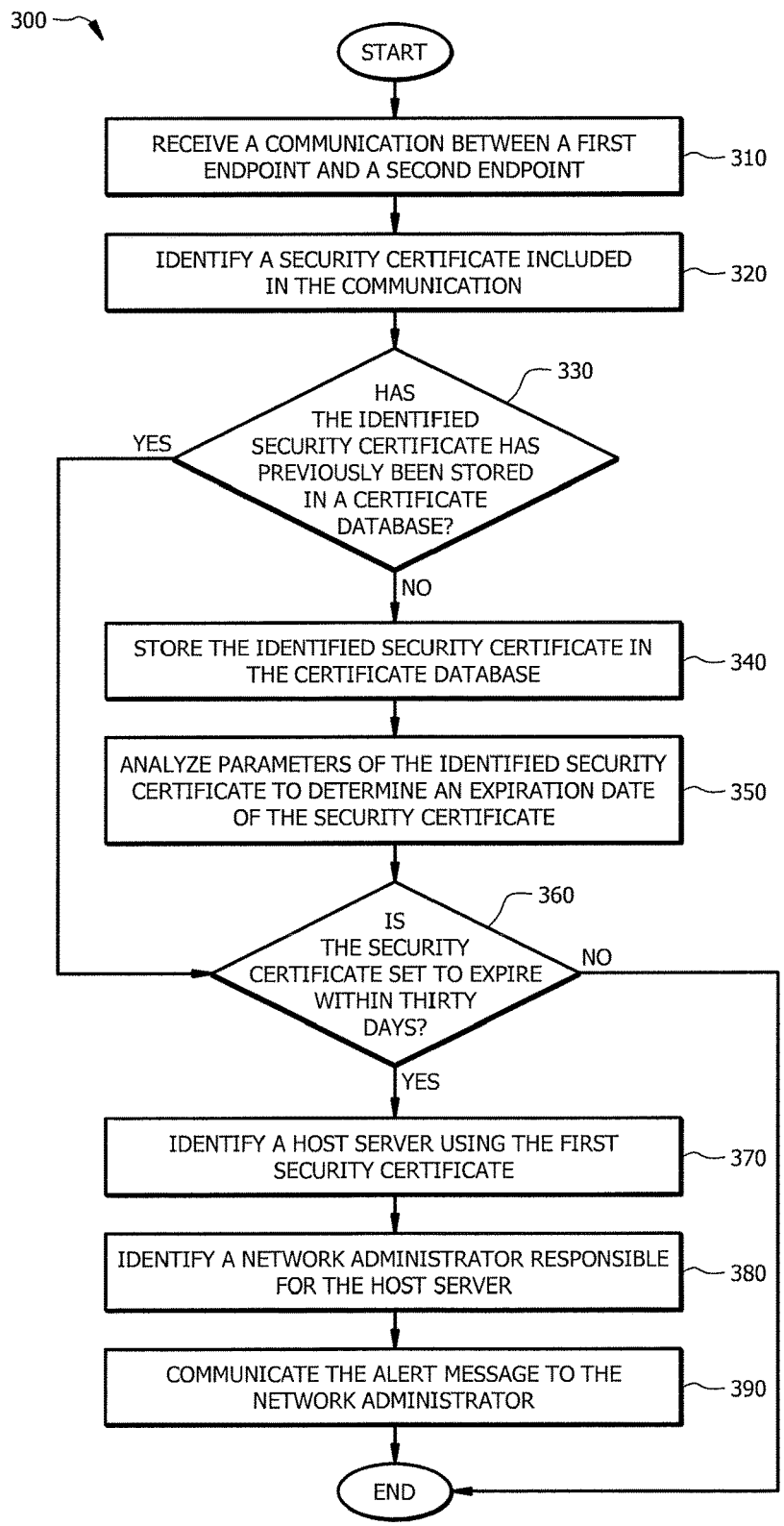
FIG. 3 is a flowchart illustrating an example method for identifying and maintaining secure communications.

Embodiments of the present disclosure and its advantages are best understood by referring to FIGS. 1-3, like numerals being used for like and corresponding parts of the various drawings.

Every day millions of online transactions are conducted over secure connections between web servers and web browsers. Establishing secure online connections between an enterprise and its customers is critical when dealing with sensitive information such as login credentials and data transfers. Enterprises spend significant resources ensuring that secure online communications with their customers proceed in an efficient manner. Furthermore, large enterprises may have expansive intra-enterprise networks that rely on secure communications between network devices. One way to establish secure online communications involves the using the https protocol.

It is advantageous to provide a system and method that provides for the identification and management of security certificates to ensure uninterrupted, secure communication between web browsers and web servers, as well as intra-network communication. For example, an enterprise may provide a website for its users to purchase goods. Users may browse the website and select the goods that they desire. Users may purchase the goods online by providing their credit card information or may login to the website to access a previously created account linked to their credit card information. To securely transmit the information (e.g., credit card numbers, routing information, login credentials), a secure connection using an https protocol may first be established between the enterprise's web servers and the user's web browser.

To establish the secure, https connection between the web browser and the server, the web browser first validates that the web server is authentic to confirm the browser is connecting with the actual enterprise and that no eavesdroppers will intercept the communications. This may be accomplished using a cryptographic protocol, such as a secure sockets layer (SSL) or transport layer security (TLS), to authenticate the web server's details and establish a cryptographic key. The web browser and the web server may then negotiate a symmetric key to encrypt communications between the browser and server. Digital certificates (e.g., SSL certificates) are issued to enterprises by a certification authority. The certification authority may require different levels of authentication depending on the type of digital certificate issued.

Importantly, SSL certificates have expiration dates. Once an SSL certificate expires, users attempting to create a secure connection with the certificate will either be denied the secure connection or will receive a security warning that the enterprise's website is untrusted. Expired SSL certificates present significant risks to large enterprises that may conduct thousands of secure transactions every minute between browsers and servers and from server to server within the enterprise. If an SSL certificate is not renewed prior to expiring, the enterprise may experience outages in their network or a loss of customer business. Furthermore, enterprises may utilize a number of unidentified security certificates within the enterprises network. These unknown security certificates present significant risks to the enterprise as they are not identified until a communications error occurs.

Unidentified security certificates may be present in an enterprise's system based on a number of situations. For example, an enterprise may purchase an application from a vendor and install the application on one or more network devices. Unknown to the enterprise, the application may include a security certificate for facilitating secure communications within the enterprise's network. Once the application's security certificate expires, the application may become an untrusted source and other network devices may stop communicating with the application. Without identifying the security certificate prior to its expiration, the enterprise may encounter operational issues until the security certificate is renewed.

As another example, an enterprise may add a node to an existing server cluster. The enterprise may clone an existing server for the new node, including the hardware specific security certificate for the existing server. This may lead to communications issues with the cloned server that will remain unaddressed until a communications failure occurs.

FIG. 1 is an example system 100 for identifying and maintaining secure communications. System 100 includes network 110 that facilitates communication between workstation 120, security certificate module 130, and security certificate database 140. Elements of system 100 may be internal to an enterprise. An enterprise may be an individual, business, company, or other organization. An example of an enterprise may include a clothing store, an online sales company, or a financial institution. An enterprise may include one or more lines of business, subsidiaries, or parent organizations.

Network 110 represents any suitable network operable to facilitate communication between the components of system 100. Network 110 may include any interconnecting system capable of transmitting audio, video, signals, data, messages, or any combination of the preceding. Network 110 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof operable to facilitate communication between the components.

Workstation 120 enables one or more users to monitor, administer, or otherwise interact with security certificate module 130 and security certificate database 140. Workstation 120 may include one or more laptops, personal computers, monitors, display devices, handheld devices, smartphones, servers, user input devices, or other suitable components for enabling user input. Workstation 120 may itself include security certificate module 130 and security certificate database 140. Workstation 120 may internal to an enterprise or could remotely access an enterprise.

For example, a network administrator may utilize workstation 120 to receive and transmit communications with security certificate module 130. A network administrator represents one or more users who are responsible for the maintenance and operation of network devices within an enterprise. Workstation 120 may receive alerts and messages from security certificate module 130 notifying the network administrator that a security certificate for a host device maintained by the network administrator will expire soon. In some embodiments, a message may be sent to workstation 120 identifying one or more security certificates issued by a certification authority that are not approved by the enterprise.

Although the illustrated embodiment shows workstation 120 as a computer, workstation 120 may be a mobile device. The alerts and messages sent by security certificate module 130 may be in the form of an email, an SMS message, or any other appropriate communications protocol. Accordingly, workstation 120 may allow users to communicate with security certificate module 130 to maintain current, active security certificates utilized by the enterprise's network devices.

In some embodiments, a network administrator may manually update a security certificate for a network device managed by the administrator. In response, the network administrator may use workstation 120 to communicate the updated security certificate to security certificate module 130. Security certificate module 130 may identify the parameters associated with the security certificate (e.g., the host device using the security certificate, the network administrator responsible for the host device, an expiration date of the security certificate, and the certification authority that issued the security certificate) then store the parameters in security certificate database 140.

Security certificate module 130 represents any suitable components that facilitate identifying and maintaining security certificates. Security certificate module 130 may include a network server, remote server, mainframe, host computer, workstation, web server, personal computer, file server, or any other suitable device operable to communicate with other devices and process data. In some embodiments, security certificate module 130 may execute any suitable operating system such as IBM's zSeries/Operating System (z/OS), MS-DOS, PC-DOS, MAC-OS, WINDOWS, UNIX, OpenVMS, Linux, or any other appropriate operating systems, including future operating systems.

The functions of security certificate module 130 may be performed by any suitable combination of one or more servers or other components at one or more locations. In the embodiment where the modules are servers, the servers may be public or private servers, and each server may be a virtual or physical server. The server may include one or more servers at the same or at remote locations. Security certificate module 130 may also include any suitable component that functions as a server. In some embodiments, workstation 120 and security certificate database 140 may be integrated with security certificate module 130 or they may operate as part of the same device or devices.

In the illustrated embodiment, security certificate module 130 includes an interface 132, a processor 134, and a memory 136, which comprises an analyzer program 138.

Interface 132 represents any suitable device operable to receive information from network 110, transmit information through network 110, perform suitable processing of the information, communicate to other devices, or any combination thereof. For example, in some embodiments interface 132 may receive a communication between a first and second endpoint in order for security certificate module 130 to analyze the communication to determine if the communication utilizes a security certificate. Interface 132 may also communicate parameters associated with identified security certificates to security certificate database 140 to maintain an up-to-date repository of certificates utilized by the enterprise.

In certain embodiments, interface 132 may communicate alerts and messages to workstation 120 to notify network administrators about expired (or soon to expire) security certificates. Interface 132 represents any port or connection, real or virtual, including any suitable hardware and/or software, including protocol conversion and data processing capabilities, to communicate through a LAN, WAN, or other communication system that allows security certificate module 130 to exchange information with network 110, workstation 120, security certificate database 140, or any other components of system 100.

Processor 134 communicatively couples interface 132 and memory 136 and controls the operation of security certificate module 130. Processor 134 includes any hardware and software that operates to control and process information. Processor 134 may execute computer-executable program instructions stored in memory 136. Processor 134 may include, but is not limited to, a microprocessor, an application specific integrated circuit (ASIC), and or state machines.

Memory 136 stores, either permanently or temporarily, data, operational software, other information for processor 134, other components of security certificate module 130, or other components of system 100. Memory 136 includes any one or a combination of volatile or non-volatile local or remote devices suitable for storing information. For example, memory 136 may include RAM, ROM, flash memory, magnetic storage devices, optical storage devices, network storage devices, cloud storage devices, solid state devices, or any other suitable information storage device or a combination of these devices.

Memory 136 may store information in one or more databases, file systems, tree structures, any other suitable storage system, or any combination thereof. Furthermore, different information stored in memory 136 may use any of these storage systems. Moreover, any information stored in memory 136 may be encrypted or unencrypted, compressed or uncompressed, and static or editable. Although illustrated as including particular modules, memory 136 may include any suitable information for use in the operation of security certificate module 130.

Security certificate database 140 may store information in one or more databases, file systems, tree structures, relational databases, any other suitable storage system, or any combination thereof. Furthermore, different information stored in memory 136 may use any of these storage systems. Moreover, any information stored in security certificate database 140 may be encrypted or unencrypted, compressed or uncompressed, and static or editable. Although illustrated as including particular modules, security certificate database 140 may include any suitable information for use in the operation of security certificate database 140. In the illustrated embodiment, security certificate database 140 includes identified security certificates 142.

In the illustrated embodiment, memory 136 includes analyzer program 138. Processor 134 may implement analyzer program 138 to facilitate identifying and analyzing known and unknown security certificates utilized by an enterprise. As explained in FIG. 2, security certificate module 130 may receive information from a communication between a first endpoint (e.g., a web browser) and a second endpoint (e.g., a web server). Analyzer program 138 may then identify a security certificate included in the communication. Analyzer program 138 may compare the identified security certificate with a list of previously identified security certificates stored in security certificate database 140. If analyzer program 138 determines that the identified security certificate is not in security certificate database 140, analyzer program 138 may then store the security certificate and its associated parameters in security certificate database 140. In this manner, security certificate module 130 may identify security certificates utilized by an enterprise and compare identified security certificates to known security certificates. This may allow an enterprise to detect previously unidentified security certificates within their network and prevent the security certificates from expiring.

Analyzer program 138 may associate a number of parameters with each security certificate utilized by the enterprise. For example, analyzer program 138 may identify the host device using the security certificate to facilitate secure communications. This may include the type of host device (server, mainframe, database) and the physical address and virtual location (IP address) of the host device.

Analyzer program 138 may also identify one or more network administrators responsible for the host device. For example, analyzer program 138 may identify the names and contact information for the network administrators responsible for the host device, including email addresses and/or phone numbers.

Analyzer program 138 may also include as a parameter, the starting date and expiration date of the security certificate. In some embodiments, a parameter may include the certification authority (e.g., Comodo, Symantec, GoDaddy) that issued the security certificate.

As another example, analyzer program 138 may identify whether the security certificate is part of a chain of multiple security certificates. A chain of certificates may include a root certificate as a trust anchor (e.g., in an X.509 architecture). The root certificate may identify the certification authority that issued the certificate. The root certificate may be used to sign other, intermediate certificates, that are then linked to the root certificate. Analyzer program 138 may identify each of the security certificates in the chain and determine whether each certificate has been previously identified and stored in security certificate database 140. In this manner, security certificate module 130 may determine whether a link in the certificate chain is defective, which may result in corrupting certificates later in the certificate chain.

In some embodiments, analyzer program 138 may identify and store the public key fingerprint associated with a security certificate in security certificate database 140. Analyzer program 138 may also identify and store the cryptographic hash function (e.g., SHA-1, SHA-2, MD5) used by the security certificate. This may allow security certificate module 130 to identify and store relevant encryption information related to each identified security certificate while conserving memory and computational resources. In some embodiments, analyzer program 138 may use the security certificate fingerprint to determine whether an identified security certificate is stored in security certificate database 140.

Analyzer program 138 may also identify any extensions included in the security certificate. Security certificate extensions may include a number of fields such as subject alternative names and enhanced key usage information. Subject alternative names may expand the identities covered by the security certificate (e.g., additional email address, DNS names, and IP addresses). An enhanced key usage extension may define additional uses of the public key associated with the security certificate (e.g. using the public key for server authentication, client authentication, email protection, and signing downloadable code). Although described using subject alternative names and enhanced key usage fields, any suitable extension and associated information may be identified and stored by analyzer program 138.

In addition to identifying security certificates, security certification module 130 may also manage the known security certificates used by system 100. For example, analyzer program 138 may determine that a security certificate stored in security certificate database 140 is set to expire within a predetermined time period (e.g., twenty-four hours, one week, one month, three months). Analyzer program 138 may identify the host server using the security certificate and the network administrator responsible for the host server. Analyzer program 138 may then communicate an alert message to the network administrator, notifying the administrator of the soon to expire security certificate and the network device using the certificate. Accordingly, security certificate module 130 may manage the known security certificates used by an enterprise and prevent future breakdowns in communications by maintaining active security certificates.

Security certificate module 130 may also allow a user to determine which security certificates are used by a specific domain name. For example, an enterprise may provide a website for its customers. The website may have multiple pages, with each page providing different features for the customer. The enterprise may utilize one or more different security certificates for each page. Using workstation 120, a user may search security certificate database 140 using analyzer program 138 to determine which security certificates are assigned to the domain name associated with the webpage.

In some embodiments, a common security certificate is utilized by multiple domain names. For example, an enterprise may provide a mobile website in a first domain name to customers accessing the website from a mobile device. The enterprise may provide a full or standard website in a second domain name to customers accessing the website from a desktop or laptop. In some embodiments, the enterprise may utilize a common security certificate for the domain name of the mobile website as well as the domain name of the standard website. Using workstation 120, a user may determine which security certificates cover multiple domains. The user may also identify the extensions included in the security certificate that expand the security certificate to the additional domain names (i.e. a subject alternative name extension).

In some embodiments, an enterprise may have a list of approved certification authorities. The enterprise may prefer or only allow security certificates from these authorities. Security certificate module 130 may identify a security certificate issued from a certification authority not approved by the enterprise. Security certificate module 130 may communicate a message to the network administrator responsible for the host device using the security certificate, and notify the network administrator that a new certificate should be obtained from an approved certification authority.

In certain embodiments, a certification authority may have a security breach that results in the security certificates from that certification authority being untrusted. Analyzer program 138 may identify the security certificates from security certificate database 140 that were issued from that certification authority and alert the network administrators responsible for the network devices using those security certificates that they need to get reissued security certificates. In this manner, an enterprise may quickly respond to security breaches to ensure secure communications within its network.

In certain embodiments, security certificate module 130 may also identify the type of SSL certificate being used by a network device. For example, an SSL certificate may be an extended validation SSL certificate, an organization validation SSL certificate, or a domain validation SSL certificate. Each type of certificate may be associated with varying levels of security. For instance, a domain validation SSL may be issued to a domain owner once the certification authority sends an email to the listed email address of the domain owner. Once the owner responds, the certificate may be issued. For organization validation certificates, a certification authority may additionally confirm the company name in addition to the domain name utilized by the certificate. An extended validation certificate may provide for additional security when communicating with an entity. A certification authority may identify the organization that controls the domain name and enable encrypted communications between the user and a website by facilitating the exchange of encryption keys (i.e., public and private keys). In certain embodiments, a user's browser may indicate that the organization is using an extended validation certificate (e.g., the address bar may turn green).

In some embodiments, an enterprise may only utilize a specific type of security certificate for certain types of communications (e.g., only extended validation certificates for communicating confidential information such as credit card numbers). If security certificate module 130 determines that a network device is utilizing the wrong type of security certificate, security certificate module 130 may notify the systems administrator that the wrong type of certificate is being used and identify the correct type of security certificate to install.

If security certificate module 130 discovers a previously unidentified security certificate used by the enterprise, security certificate module 130 may also take steps to determine why the security certificate was unidentified. For example, the security certificate may be used by an application created by a third party. The third party may have failed to identify the security certificates used by the application. Security certificate module 130, may store as a parameter the application and vendor associated with the security certificate so that the enterprise may check future applications by the vendor for security certificates before utilizing the applications in the enterprise's network.

A component of system 100 may include an interface, logic, memory, and other suitable elements. An interface receives input, sends output processes the input and/or output, and performs other suitable operations. An interface may comprise hardware and software. Logic performs the operation of the component. For example, logic executes instructions to generate output from input. Logic may include hardware, software and other logic. Logic may be encoded in one or more non-transitory, tangible media, such as a computer readable medium or any other suitable tangible medium, and may perform operations when executed by a computer. Certain logic, such as a processor, may manage the operation of a component. Examples of a processor include one or more computers, one or more microprocessors, one or more applications, and other logic.

Modifications, additions, or omissions may be made to system 100 without departing from the scope of the invention. For example, although system 100 is described as facilitating communications using SSL certificates, embodiments of the present disclosure may be extended to TLS communications. Furthermore, communications may extend to email, secure shell (SSH) protocols, XMPP communications, or any other suitable communications in system 100. In some embodiments, analyzer program 138 may store additional parameters associated with a security certificate such as the algorithm ID used by the security certificate. Any suitable logic may perform the functions of system 100 and the components within system 100.

FIG. 2 is an example block diagram 200 for detecting security certificates within a network. Block diagram 200 includes network switch 210, which may faciliate communications between application server 220, web server 230, and database 240. Network switch 210 may also include protocol analyzer 250 communicatively coupled to analyzer program 138.

In the illustrated embodiment, application server 220, web server 230, and database 240 may securely communicate with one another using a plurality of security certificates. For example, an enterprise may provide a website for users to login and view their account information. In some embodiments, the enterprise may be a financial institution that allows users to login to their account and transfer money between one or more debit and credit accounts. Web server 230 may utilize one or more security certificates to facilitate secure communications with users logging into their account.

Once logged in, the user may have access to a number of applications hosted an run by application server 220. For example, a user may check the balance of their credit card. Web server 230 may communicate this command to application server 220 through network switch 210. Application server 220 may then access database 240 through network switch 210 to determine the balance of the user's credit card. Application server 220 may then communicate the balance back to web server 230 through network switch 210 and web server 230 may relay the information to the user. Each of these communications may be completed using a secure connection facilitated by one or more security certificates.

In some embodiments, protocol analyzer 250 may be interfaced with network switch 210. Protocol analyzer 250 represents any hardware or software operable to detect and analyze communications between network devices or within a single network device (different ports within a single server). In certain embodiments, protocol analyzer 250 is a network sniffer. In some embodiments, protocol analyzer 250 may be part of interface 132. In some embodiments, protocol analyzer 250 may be a standalone device. Although illustrated as communicating with network switch 210, protocol analyzer 250 may be located at any appropriate location within an enterprise to identify and analyze communications. For instance, protocol analyzer 250 may be interfaced with web server 230 to focus on the communications received and transmitted by web server 230.

Depending on the size of the enterprise and the number of communications being analyzed, protocol analyzer 250 may run continuously to analyze the communications through a network device or it may run at specific or periodic times. For instance, an enterprise may have protocol analyzer 250 run at the beginning of every hour for a set time period (e.g., 15 minutes).

Protocol analyzer 250 may identify and analyze a plurality of information associated with the communications it analyzes. For example, protocol analyzer 250 may identify the communication packets transferred between devices, the IP addresses of the devices involved, the applications being used, and the data being transferred.

Protocol analyzer 250 may determine when communications between network devices are communicating using SSL (or TLS) security protocol. For example, a user may interface with web server 230. The user's browser may request a secure page from web server 230 (e.g., https). In some embodiments, this may indicate that communication should proceed over port 443 (i.e., when using the TCP/IP standard). Depending on the browser and the communication protocol, a number of communication packets may be transferred between web server 230 and the user's browser.

In some embodiments, the browser may communicate the SSL (or TLS) version requested to web server 230 and the encryption algorithms that the browser supports. Web server 230 may respond with the public encryption key used to verify security certificates. Web server 230 may also transmit the security certificate to validate the communication from web server 230 (i.e., that web server 230 is actually from the organization the user is trying to communicate with). Importantly, the browser may then confirm that the certificate was issued by a valid certification authority and that the certificate has not expired and/or is not premature. The browser may then use the public key to encrypt data to send to web server 230 and web server 230 may use a private key to decrypt the data sent by the browser.

In a similar manner, secure communications may be transmitted between application server 220, web server 230, and database 240. Protocol analyzer 250 may detect the packets exchanging the security certificates and analyzer program 138 may determine whether the security certificates were previously identified by the enterprise, as described in FIG. 1.

Modifications, additions, or omissions may be made to block diagram 200 without departing from the scope of the invention. For example, although block diagram 200 includes application server 220, web server 230, and database 240, and appropriate network devices may be used. Any suitable logic may perform the functions of block diagram 200 and the components within block diagram 200.

FIG. 3 is a flowchart illustrating an example method 300 for identifying and maintaining secure communications. At step 310, security certificate module 130 may receive a communication between a first endpoint and a second endpoint. In some embodiments, security certificate module 130 receives information associated with a communication between a first endpoint and a second endpoint. The information may be associated with the establishment of secure communications between the first and second endpoints. In certain embodiments the first endpoint may be a web browser while the second endpoint may be a web server. In some embodiments, the first endpoint may be a first network device associated with an enterprise and the second endpoint may be a second network device associated with the enterprise.

At step 320, security certificate module 130 may analyze the communication and identify a security certificate included in the communication. As described above in FIG. 2, analyzer program 138 may identify security certificates transferred between endpoints in any suitable manner. For example, web server 230 may communicate a security certificate to a web browser to allow the web browser to encrypt a communication using a public key provided by the security certificate.

At step 330, analyzer program 138 may identify the security certificate communicated to the web browser, and compare the security certificate to a list of known/previously identified security certificates stored in security certificate database 140. If analyzer program 138 determines that the security certificate is already in security certificate database 140, then the sequence may proceed to step 360. If the security certificate is not already in security certificate database 140 then the sequence may proceed to step 340.

At step 340, analyzer program 138 may analyze parameters of the identified security certificate to determine an expiration date of the security certificate. For example, analyzer program 138 may identify the "Not Before" and "Not After" dates associated with the security certificate to ensure that it is current. At step 350, analyzer program 138 may then store the security certificate (i.e., information associated with the certificate) used by the network device in security certificate database 140.

At step 360, analyzer program 138 may determine whether the security certificate is set to expire within a certain time period (e.g., twenty-four hours, a week, thirty days). An enterprise may set this time period based on the enterprise's own operating procedures. If the security certificate is not set to expire within the time period, the sequence may end. If the security certificate is set to expire within the time period, the sequence may proceed to step 370.

At step 370, analyzer program 138 may identify a host server using the identified security certificate. At step 380, analyzer program 138 may also identify a system administrator responsible for maintaining the host server. At step 390, analyzer program 138 may then communicate an alert message to the network administrator notifying the administrator of the pending expiration of the security certificate. In this manner, an enterprise may prevent security certificates from expiring and interrupting the secure exchange of information.

Various embodiments may perform some, all, or none of the steps described above. For example, analyzer program 138 may identify a number of parameters associated with the security certificate based on the certificate itself, and the devices communicating the certificate. In some embodiments, the parameters analyzed include the version number, serial number, signature algorithm, issuer, public key information, and signature algorithm included in the security certificate. In some embodiments, analyzer program 138 may also identify which network device communicated the security certificate and whether the security certificate is part of a security certificate chain. Although discussed as security certificate module 130 performing these steps, any suitable component of method 300 may perform one or more steps of the method.

Certain embodiments of the disclosure may provide one or more technical advantages. One advantage of the present disclosure provides a system for identifying unknown secure sockets layer (SSL) certificates used by an enterprise, which prevents the expiration of the unknown SSL certificates that would otherwise result in an untrusted connection between network devices. Another advantage of the present disclosure allows for the efficient management of SSL certificates for enterprise systems by identifying and tracking the lifespan of SSL certificates and alerting the enterprise before an SSL certificate expires. Yet another advantage of the present disclosure alerts system engineers to SSL certificate problems by specifically identifying the servers within the enterprise relying on active SSL certificates, which results in improved network communications. One or more other technical advantages may be readily apparent to one skilled in the art from the figures, descriptions, and claims, included herein.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

The invention claimed is:

1. A system for managing secure communications, comprising:
   a certificate database operable to store a list of previously identified security certificates;
   an interface operable to:
      receive a communication between a first endpoint and a second endpoint; and
   a security certificate module implemented by a processor communicatively coupled to the interface and operable to:
      identify a security certificate included in the communication;
      analyze parameters of the identified security certificate, wherein the parameters comprise:
         a certificate type for the security certificate, wherein the certificate type is associated with certain types of communications;
         a host device using the security certificate;
         a network administrator responsible for the host device;
         an expiration date of the security certificate; and
         a certification authority issuing the security certificate;
      determine whether the host device is utilizing a correct certificate type for the security certificate in the communication;
      compare the identified security certificate to the list of previously identified security certificates;
      determine whether the identified security certificate has previously been stored in the certificate database based on the comparison;
      determine whether the security certificate is part of a chain of multiple security certificates, wherein:
         the chain of multiple security certificates comprises a root certificate linked with one or more intermediate certificates; and
         the root certificate is used to sign the one or more intermediate certificates;
      determine whether each of the security certificates in the chain of multiple security certificates has been previously stored in the certificate database;
      store the identified security certificate in the certificate database in response to:
         determining that the identified security certificate has not been previously stored in the certificate database;
         determining that the host device is utilizing the correct certificate type for the security certificate in the communication; and determining that each of the security certificates in the chain of multiple security certificates has been previously stored in the certificate database;
store encryption information associated with the identified security certificate in response to storing the identified security certificate; and
in response to determining that the host device is utilizing a wrong certificate type for the security certificate in the communication, notify, by the security certificate module, a systems administrator that the wrong type of security certificate is being used, and identify the correct type of security certificate to install.

2. The system of claim 1, wherein:
the interface is further operable to receive an alert indicating that a first security certificate stored in the certificate database has a first expiration date that is set to expire within a predetermined time period; and
the security certificate module is further operable to:
identify the host device using the first security certificate; and
identify the network administrator responsible for the host device, wherein the interface is further operable to communicate the alert message to the network administrator.

3. The system of claim 2, wherein the predetermined time period is one selected from a group consisting of:
twenty-four hours, one week, one month, and three months.

4. The system of claim 1, wherein the security certificate is a security sockets layer (SSL) certificate selected from a group consisting of:
an extended validation SSL certificate, an organization validation SSL certificate, and a domain validation SSL certificate.

5. The system of claim 1, wherein the first endpoint is a web browser and the second endpoint is a web server.

6. The system of claim 1, wherein the first endpoint is a first server and the second endpoint is a second server, wherein the first and second servers are associated with an enterprise.

7. The system of claim 1, wherein:
the security certificate module is further operable to determine that the certification authority issuing the security certificate is an unapproved certification authority; and
the interface is further operable to communicate a message to the network administrator responsible for the host device, wherein the message indicates that the security certificate is from an unapproved certification authority.

8. A method for managing secure communications, comprising:
receiving, at an interface, a communication between a first endpoint and a second endpoint;
identifying, using security certificate module implemented by a processor communicatively coupled to the interface, a security certificate included in the communication;
analyzing, using the security certificate module, parameters of the identified security certificate, wherein the parameters comprise:
a certificate type for the security certificate, wherein the certificate type is associated with certain types of communications;
a host device using the security certificate;
a network administrator responsible for the host device;
an expiration date of the security certificate; and
a certification authority issuing the security certificate;
determine whether the host device is utilizing a correct certificate type for the security certificate in the communication;
comparing, using the security certificate module, the identified security certificate to a list of previously identified security certificates stored in a certificate database;
determining, using the security certificate module, whether the identified security certificate has previously been stored in the certificate database based on the comparison;
determining, using the security certificate module, whether the security certificate is part of a chain of multiple security certificates, wherein:
the chain of multiple security certificates comprises a root certificate linked with one or more intermediate certificates; and
the root certificate is used to sign the one or more intermediate certificates;
determining, using the security certificate module, whether each of the security certificates in the chain of multiple security certificates has been previously stored in the certificate database;
storing, using the security certificate module, the identified security certificate in the certificate database in response to:
determining that the identified security certificate has not been previously stored in the certificate database;
determine that the host device is utilizing the correct certificate type for the security certificate in the communication; and
determining that each of the security certificates in the chain of multiple security certificates has been previously stored in the certificate database;
storing, using the security certificate module, encryption information associated with the identified security certificate in response to storing the identified security certificate; and
in response to determining that the host device is utilizing a wrong certificate type for the security certificate in the communication, notify, by the security certificate module, a systems administrator that the wrong type of security certificate is being used, and identify the correct type of security certificate to install.

9. The method of claim 8, further comprising:
receiving an alert indicating that a first security certificate stored in the certificate database has an first expiration date that is set to expire within a predetermined time period;
identifying the host device using the first security certificate;
identifying the network administrator responsible for the host device; and
communicating the alert message to the network administrator.

10. The method of claim 9, wherein the predetermined time period is one selected from a group consisting of:
twenty-four hours, one week, one month, and three months.

11. The method of claim 8, wherein the security certificate is a secure sockets layer (SSL) certificate selected from a group consisting of:

an extended validation SSL certificate, an organization validation SSL certificate, and a domain validation SSL certificate.

12. The method of claim 8, wherein the first endpoint is a web browser and the second endpoint is a web server.

13. The method of claim 8, wherein the first endpoint is a first server and the second endpoint is a second server, wherein the first and second servers are part of associated with an enterprise.

14. The method of claim 8, further comprising:
determining that the certification authority issuing the security certificate is an unapproved certification authority; and
communicating a message to the network administrator responsible for the host device, wherein the message indicates that the security certificate is from an unapproved certification authority.

15. A non-transitory computer readable medium comprising logic, the logic operable, when executed by a processor, to:
receive a communication between a first endpoint and a second endpoint;
identify a security certificate included in the communication;
analyze parameters of the identified security certificate, wherein the parameters comprise:
a certificate type for the security certificate, wherein the certificate type is associated with certain types of communications;
a host device using the security certificate;
a network administrator responsible for the host device;
an expiration date of the security certificate; and
a certification authority issuing the security certificate;
determine whether the host device is utilizing a correct certificate type for the security certificate in the communication;
compare the identified security certificate to a list of previously identified security certificates in a certificate database;
determine whether the identified security certificate has previously been stored in the certificate database based on the comparison;
determine whether the security certificate is part of a chain of multiple security certificates, wherein:
the chain of multiple security certificates comprises a root certificate linked with one or more intermediate certificates; and
the root certificate is used to sign the one or more intermediate certificates;
determine whether each of the security certificates in the chain of multiple security certificates has been previously identified and stored in the certificate database;
store the identified security certificate in the certificate database in response to:
determining that the identified security certificate has not been previously stored in the certificate database;
determining that the host device is utilizing the correct certificate type for the security certificate in the communication; and
determining that each of the security certificates in the chain of multiple security certificates has been previously identified and stored in the certificate database;
store encryption information associated with the identified security certificate in response to storing the identified security certificate; and
in response to determining that the host device is utilizing a wrong certificate type for the security certificate in the communication, notify, by the security certificate module, a systems administrator that the wrong type of security certificate is being used, and identify the correct type of security certificate to install.

16. The non-transitory medium of claim 15, wherein the logic is further operable to:
receive an alert indicating that a first security certificate stored in the certificate database has an first expiration date that is set to expire within a predetermined time period;
identify the host device using the first security certificate;
identify the network administrator responsible for the host device; and
communicate the alert message to the network administrator.

17. The non-transitory medium of claim 16, wherein the predetermined time period is one selected from a group consisting of:
twenty-four hours, one week, one month, and three months.

18. The non-transitory medium of claim 15, wherein the security certificate is an secure sockets layer (SSL) certificate selected from a group consisting of:
an extended validation SSL certificate, an organization validation SSL certificate, and a domain validation SSL certificate.

19. The non-transitory medium of claim 15, wherein the first endpoint is a web browser and the second endpoint is a web server.

20. The non-transitory medium of claim 15, wherein the first endpoint is a first server and the second endpoint is a second server, wherein the first and second servers are part of an enterprise.

* * * * *